(12) United States Patent
Dyson et al.

(10) Patent No.: US 11,174,752 B2
(45) Date of Patent: Nov. 16, 2021

(54) CERAMIC MATRIX COMPOSITE COMPONENT INCLUDING COOLING CHANNELS IN MULTIPLE PLIES AND METHOD OF PRODUCING

(71) Applicant: General Electric Company, Schenectady, NY (US)

(72) Inventors: Thomas Earl Dyson, Niskayuna, NY (US); Daniel Gene Dunn, Guilderland, NY (US); Changjie Sun, Clifton Park, NY (US); Christopher Jon Potokar, Whitefish Bay, WI (US); Douglas Glenn Decesare, Queensbury, NY (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 16/723,011

(22) Filed: Dec. 20, 2019

(65) Prior Publication Data

US 2021/0189902 A1 Jun. 24, 2021

(51) Int. Cl.
| | | |
|---|---|---|
| *F01D 25/00* | (2006.01) | |
| *F01D 5/14* | (2006.01) | |
| *F01D 9/02* | (2006.01) | |
| *C04B 35/657* | (2006.01) | |
| *C04B 35/80* | (2006.01) | |
| *C04B 38/06* | (2006.01) | |
| *F01D 25/24* | (2006.01) | |

(52) U.S. Cl.
CPC .......... *F01D 25/005* (2013.01); *C04B 35/657* (2013.01); *C04B 35/806* (2013.01); *C04B 38/0615* (2013.01); *F01D 5/14* (2013.01); *F01D 9/02* (2013.01); *F01D 25/24* (2013.01); *C04B 2235/3826* (2013.01); *C04B 2235/616* (2013.01); *F05D 2230/10* (2013.01)

(58) Field of Classification Search
CPC . F01D 5/14; F01D 9/02; F01D 25/005; F01D 25/24; C04B 35/657; C04B 35/806; C04B 38/0615; C04B 2235/616; C04B 2235/3826; F05D 2230/10
See application file for complete search history.

(56) References Cited

U.S. PATENT DOCUMENTS

| | | | |
|---|---|---|---|
| 6,733,907 B2 * | 5/2004 | Morrison | ................ F01D 5/288 428/699 |
| 6,746,755 B2 * | 6/2004 | Morrison | ................ F01D 5/187 428/166 |
| 7,198,458 B2 | 4/2007 | Thompson | |
| 7,255,535 B2 | 8/2007 | Albrecht et al. | |

(Continued)

*Primary Examiner* — Igor Kershteyn
(74) *Attorney, Agent, or Firm* — Dority & Manning, P.A.

(57) ABSTRACT

A ceramic matrix composite (CMC) component and method of fabrication including one or more elongate functional features formed in multiple fiber plies of the CMC component. The CMC component includes a plurality of longitudinally extending ceramic matrix composite plies in a stacked configuration. Each of the one or more elongate functional features includes an inlet and an outlet to provide a flow of fluid from a fluid source to an exterior of the ceramic matrix composite component. The one or more elongate functional features are configured in multiple plies of the plurality of longitudinally extending ceramic matrix composite plies to form a plurality of cooling channels in multiple plies of the ceramic matrix composite component.

20 Claims, 11 Drawing Sheets

(56) References Cited

U.S. PATENT DOCUMENTS

| | | |
|---|---|---|
| 8,257,809 B2 | 9/2012 | Morrison et al. |
| 8,815,371 B2 * | 8/2014 | Arrell ............... F01D 5/288 |
| | | 428/172 |
| 2008/0199661 A1 * | 8/2008 | Keller ............... B32B 3/08 |
| | | 428/188 |
| 2017/0101873 A1 | 4/2017 | Morgan et al. |
| 2017/0122113 A1 | 5/2017 | Kittleson et al. |
| 2018/0328189 A1 | 11/2018 | Frey et al. |
| 2019/0106990 A1 | 4/2019 | Subramanian et al. |

\* cited by examiner

CERAMIC MATRIX COMPOSITE COMPONENT INCLUDING COOLING CHANNELS IN MULTIPLE PLIES AND METHOD OF PRODUCING

The present invention relates generally to gas turbines for power generation and more specifically to methods of forming ceramic matrix composite components for hot gas path turbine components for gas turbines.

BACKGROUND

Silicon carbide (SiC)-based ceramic matrix composite (CMC) materials have been proposed as materials for certain components of gas turbine engines, such as the turbine blades, vanes, nozzles, shrouds, and buckets. Various methods are known for fabricating SiC-based components, including Silicomp, melt infiltration (MI), chemical vapor infiltration (CVI), polymer inflation pyrolysis (PIP), and oxide/oxide methods. Though these fabrication techniques significantly differ from each other, each involves the use of hand lay-up and tooling or dies to produce a near-net-shape part through a method that includes the application of heat at various method stages.

As with turbine blades and vanes formed from more conventional superalloy materials, CMC blades, vanes and shrouds are primarily equipped with cavities and cooling voids to reduce weight, reduce centrifugal load, and reduce operating temperatures of the components. These features are typically formed in CMC components using a combination of removable and expendable tooling, drilling or the like. Internal cooling channels are advantageous for cooling the both metal and CMC hot-gas path hardware as they reduce cooling flow requirements and thermal gradients/stress.

In many instances, the CMC gas turbine components are subject to extreme conditions in the form of extreme thermal gradients and high temperatures. Even with the inclusion of cavities and cooling voids in the CMC component as previously described, the extreme conditions may drive crack formation, coating spallation, and recession in the CMC components. Reduced service life from these problems prevents CMC components from realizing their full potential.

Accordingly, there is a need for a ceramic matrix composite component and method of producing a ceramic matrix composite component that provide improved cooling to the CMC gas turbine components when subject to extreme conditions, such as extreme thermal gradients and high temperatures.

BRIEF DESCRIPTION

Aspects and advantages of the disclosure will be set forth in part in the following description, or may be obvious from the description, or may be learned through practice of the disclosure.

A ceramic matrix composite (CMC) component is generally provided, along with a method of forming the component. In one embodiment, the ceramic matrix composite component includes a plurality of longitudinally extending ceramic matrix composite plies in a stacked configuration forming a densified body; and one or more elongate functional features formed therein the densified body. Each of the one or more elongate functional features includes an inlet and an outlet. The one or more elongate functional features are configured to provide a flow of fluid from a fluid source to an exterior of the ceramic matrix composite component. Each of the one or more elongate functional features are configured in multiple plies of the plurality of longitudinally extending ceramic matrix composite plies to form a plurality of cooling channels in multiple plies of the ceramic matrix composite component.

In an alternate embodiment, the ceramic matrix composite component includes a plurality of longitudinally extending ceramic matrix composite plies in a stacked configuration forming a densified body; and one or more elongate functional features formed in multiple plies of the plurality of longitudinally extending ceramic matrix composite plies. Each of the one or more elongate functional features is in fluid communication with one or more elongate functional features in another one of the plurality of longitudinally extending ceramic matrix composite plies via one or more fluid connections. Each of the one or more elongate functional features includes an inlet and an outlet. The one or more elongate functional features defining a plurality of cooling channels in multiple plies of the ceramic matrix composite component to carry a flow of fluid from a fluid source to an exterior of the ceramic matrix composite component.

In yet another embodiment, the method of forming a ceramic matrix composite (CMC) product includes forming a CMC preform comprising a matrix precursor, a plurality of reinforcing fibers and a plurality of sacrificial fibers; performing one of: removing the plurality of sacrificial fibers such that one or more elongate functional features are formed in multiple fiber plies of the CMC preform; or applying a fluid infiltrant to the CMC preform thereby densifying the CMC preform, performing the other of: removing the plurality of sacrificial fibers such that one or more elongate functional features are formed in multiple fiber plies of the CMC preform; or applying a fluid infiltrant to the CMC preform thereby densifying the CMC preform, and coupling the one or more functional features of the multiple fiber plies of the CMC preform in fluid communication to form a plurality of cooling channels in multiple plies of the ceramic matrix composite component.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended drawings, in which.

Wherever possible, the same reference numbers will be used throughout the drawings to represent the same parts.

DETAILED DESCRIPTION

Figure 1:
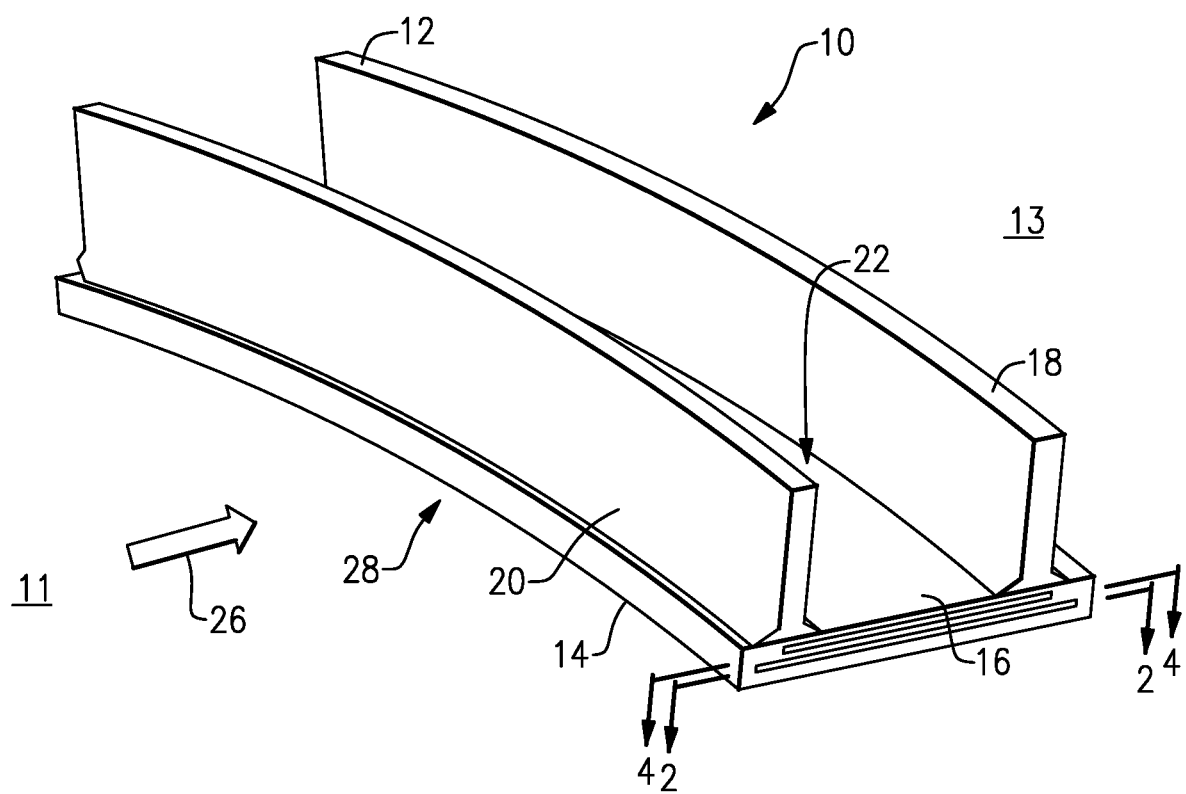
FIG. 1 is a perspective view of a ceramic matrix component (CMC), and more particularly, a portion of a CMC shroud, in accordance with one or more embodiments disclosed herein.

Embodiments of the present disclosure, for example, in comparison to concepts failing to include one or more of the features disclosed herein, enable the formation of a plurality of cooling channels in multiple fiber planes, or composite plies, of a CMC component, wherein in a preferred embodiment, the channels are configured in alignment with a respective CMC ply. The inclusion of the cooling channels in multiple fiber plies of the CMC component limits the strength reduction for any given ply while also providing a change in channel orientation without cutting through the fibers. The design of the cooling channels provides for greater robustness to recession, provides maintenance of the component structural integrity and reduces thermal stresses by spreading out the channels through the CMC space. The method, according to the present disclosure, has decreased complexity with low cost, and more efficient cooling with the ability to reduce the cooling demand and flow-rate of the part.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In the present disclosure, when a layer, or ply, is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

In addition, in the present disclosure, when a layer, or ply, is being described it is understood that multiple layers or plies may be formed in a similar manner and having a similar geometry and stacked one atop another to form what is commonly referred to as a ply pack.

Chemical elements are discussed in the present disclosure using their common chemical abbreviation, such as commonly found on a periodic table of elements. For example, Hydrogen would be represented by its common chemical abbreviation H; Helium would be represented by its common chemical abbreviation He; and so forth.

As used herein, the "average particle diameter" or "average fiber diameter" refers to the diameter of a particle or fiber such that about 50% of the particles or fibers have a diameter that is greater than that diameter, and about 50% of the particles or fibers have a diameter that is less than that diameter.

As used herein, "substantially" refers to at least about 90% or more of the described group. For instance, as used herein, "substantially all" indicates that at least about 90% or more of the respective group have the applicable trait and "substantially no" or "substantially none" indicates that at least about 90% or more of the respective group do not have the applicable trait. As used herein, the "majority" refers to at least about 50% or more of the described group. For instance, as used herein, "the majority of" indicates that at least about 50% or more of the respective group have the applicable trait.

A ceramic matrix composite product (a "CMC product"), particularly a ceramic matrix composite product formed from melt infiltration, is generally provided herein, along with methods of forming such product. The CMC product is formed a plurality of plies, or fiber planes, including one or more elongate functional features configured for enhancing the function of the CMC, such as by forming a plurality of cooling channels, or cooling circuit, in the CMC preform.

Systems used to generate power include, but are not limited to, gas turbines, steam turbines, and other turbine assemblies, such as land based aero-derivatives, used for power generation and aircraft engines. In certain applications, the power generation systems, including the turbomachinery therein (e.g., turbines, compressors, and pumps) and other machinery, may include components that are exposed to heavy wear conditions. For example, certain power generation system components, such as blades, buckets, casings, rotor wheels, shafts, shrouds, nozzles, combustor liners and so forth, may operate in high heat and/or high revolution environments. These components are manufactured using ceramic matrix composites and these components may also include cooling passages. The present disclosure provides a CMC component including a plurality of cooling passages or channels throughout the CMC component in multiple CMC plies, or multiple fiber planes, and a method of forming the ceramic matrix composite (CMC) components. Exemplary embodiments of the disclosure are shown in FIGS. 1-22 as a portion of a turbine shroud, but the present disclosure is not limited to the illustrated structure.

FIG. 1 is a perspective view of a component 10, such as, but not limited to, a segment of a turbine shroud. Although FIG. 1 shows a turbine shroud segment 12, other suitable components, according to the present disclosure, include, but are not limited to, a combustor liner, a blade, a nozzle, a nozzle end wall, a shroud, a blade platform or other hot gas path component. Component 10 is preferably formed of a ceramic matrix composite (CMC) material. As used herein, ceramic matrix composite or "CMCs" refers to composites comprising a ceramic matrix reinforced by ceramic fibers. Some examples of CMCs acceptable for use herein can include, but are not limited to, materials having a matrix and reinforcing fibers comprising oxides, carbides, nitrides, oxycarbides, oxynitrides and mixtures thereof. Examples of non-oxide materials include, but are not limited to, CMCs with a silicon carbide matrix and silicon carbide fiber (when made by silicon melt infiltration, this matrix will contain residual free silicon); silicon carbide/silicon matrix mixture and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Accordingly, as used herein, the term "ceramic matrix composite" includes, but is not limited to, carbon-fiber-reinforced carbon (C/C), carbon-fiber-reinforced silicon carbide (C/SiC), and silicon-carbide-fiber-reinforced silicon carbide (SiC/SiC). In one embodiment, the ceramic matrix composite material has increased elongation, fracture toughness, thermal shock, and anisotropic properties as compared to a (non-reinforced) monolithic ceramic structure.

There are several methods that can be used to fabricate SiC—SiC CMCs. In one approach, the matrix is partially formed or densified through melt infiltration (MI) of molten silicon or silicon containing alloy into a CMC preform. In another approach, the matrix is at least partially formed through chemical vapor infiltration (CVI) of silicon carbide into a CMC preform. In a third approach, the matrix is at least partially formed by pyrolyzing a silicon carbide yielding pre-ceramic polymer. This method is often referred to as polymer infiltration and pyrolysis (PIP). Combinations of the above three techniques can also be used.

In one example of the MI CMC process, a boron-nitride based coating system is deposited on SiC fiber. The coated fiber is then impregnated with matrix precursor material in order to form prepreg tapes. One method of fabricating the tapes is filament winding. The fiber is drawn through a bath of matrix precursor slurry and the impregnated fiber wound on a drum. The matrix precursor may contain silicon carbide and or carbon particulates as well as organic materials. The impregnated fiber is then cut along the axis of the drum and is removed from the drum to yield a flat prepreg tape where the fibers are nominally running in the same direction. The resulting material is a unidirectional prepreg tape. The prepreg tapes can also be made using continuous prepregging machines or by other means. The tape can then be cut into shapes, layed up, and laminated to produce a preform. The preform is pyrolyzed, or burned out, in order to char any organic material from the matrix precursor and to create porosity. Molten silicon is then infiltrated into the porous preform, where it can react with carbon to form silicon carbide. Ideally, excess free silicon fills any remaining porosity and a dense composite is obtained. The matrix produced in this manner typically contains residual free silicon.

The prepreg MI process generates a material with a two-dimensional fiber architecture by stacking together multiple one-dimensional prepreg plies where the orientation of the fibers is varied between plies. Plies are often identified based on the orientation of the continuous fibers. A zero degree orientation is established, and other plies are designed based on the angle of their fibers with respect to the zero degree direction. Plies in which the fibers run perpendicular to the zero direction are known as 90 degree plies, cross plies, or transverse plies.

The MI approach can also be used with two-dimensional or three-dimensional woven architectures. An example of this approach would be the slurry-cast process, where the fiber is first woven into a three-dimensional preform or into a two-dimensional cloth. In the case of the cloth, layers of cloth are cut to shape and stacked up to create a preform. A chemical vapor infiltration (CVI) technique is used to deposit the interfacial coatings (typically boron nitride based or carbon based) onto the fibers. CVI can also be used to deposit a layer of silicon carbide matrix. The remaining portion of the matrix is formed by casting a matrix precursor slurry into the preform, and then infiltrating with molten silicon.

An alternative to the MI approach is to use the CVI technique to densify the Silicon Carbide matrix in one-dimensional, two-dimensional or three-dimensional architectures. Similarly, PIP can be used to densify the matrix of the composite. CVI and PIP generated matrices can be produced without excess free silicon. Combinations of MI, CVI, and PIP can also be used to densify the matrix.

A plurality of the shroud segments 12 (of which only a single shroud segment is illustrated) define the shroud structure and are arranged circumferentially and concentric with a rotor on which the turbine blades are mounted. Generally, the shroud is produced in a ring, segmented, and then provided for end use application as a set. As previously stated, the present disclosure is not intended to be limited to the particular shroud segment shown.

Each shroud segment 12 generally includes an arcuate shroud base 14 made up of a plurality of CMC plies (described presently) and having an axial component. A pair of upstanding ribs 18 and 20 are formed substantially perpendicular to the arcuate shroud base 14. The ribs 18, 20 act to support the arcuate shroud base 14, and in combination define cooling passages (described presently) in the shroud base 14 and chambers, e.g., a chamber 22. The ribs 18, 20, and any included optional flanges (not shown), serve to mount the shroud segments 12 within an engine casing and mounting structure. Additional cooling passages (not shown) may be disposed in the ribs 18, 20. During operation of a power generation system, a flow of cooling air (not shown) is directed through the cooling passages in the shroud base 14 to reduce the temperature of the shroud segment 12.

Typically, in a gas turbine engine a plurality of stationary shroud segments, generally similar to shroud segment 12, are assembled circumferentially about an axial flow engine axis and radially outwardly about rotating blading members, e.g., turbine blades, to define a part of the radial outer flow path boundary over the blades. In addition, the assembly of shroud segments is assembled in an engine axially between such axially adjacent engine members as nozzles and/or engine frames. The stationary shroud confines the combustion gases to the gas flow path so that the combustion gas is utilized with maximum efficiency to turn the gas turbine. Operating temperature of this flow path can be greater than 500° C. The shroud segment 12, which includes a surface 28 defining an inner diameter, is exposed to a hot flow gas path, as indicated by directional arrow 26 that flows directionally forward the shroud segment, generally referenced 11, to aft the shroud segment, generally referenced 13, through the figures.

Figure 2:
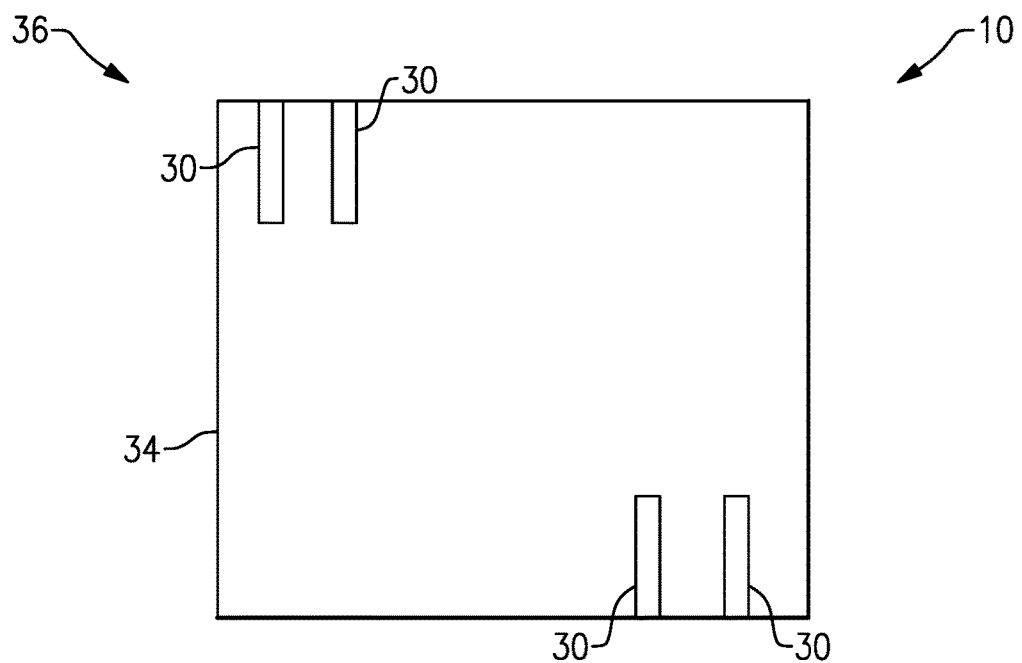
FIG. 2 is a sectional view of a portion of the ceramic matrix composite (CMC) component of FIG. 1 taken in direction 2-2 of FIG. 1 and illustrating a single CMC ply, in accordance with one or more embodiments disclosed herein.
Figure 3:
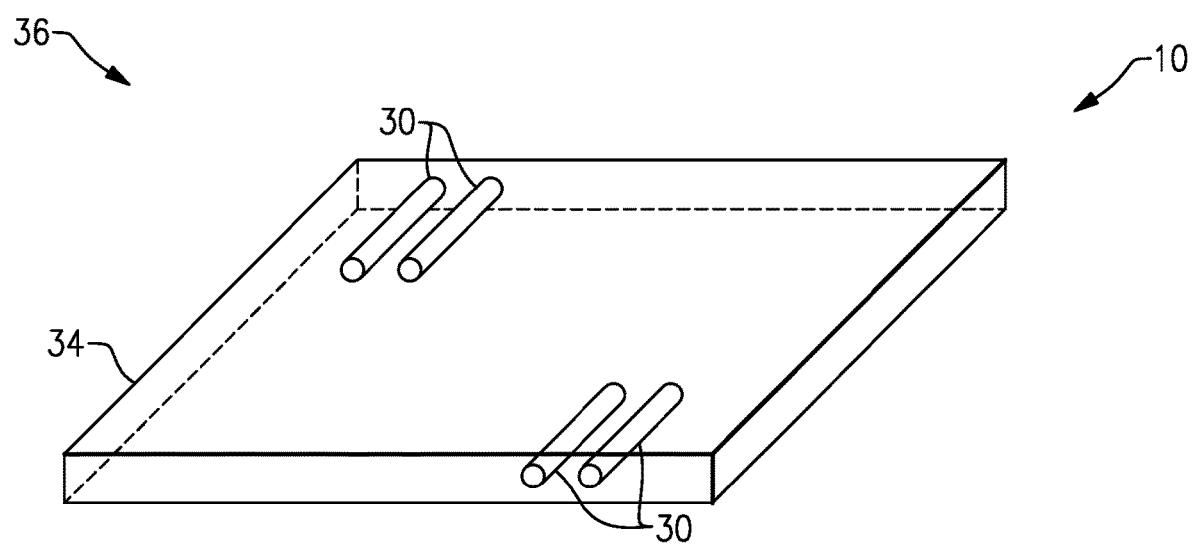
FIG. 3 is an isometric view of the portion of the ceramic matrix composite (CMC) component of FIG. 2, in accordance with one or more embodiments disclosed herein.
Figure 4:
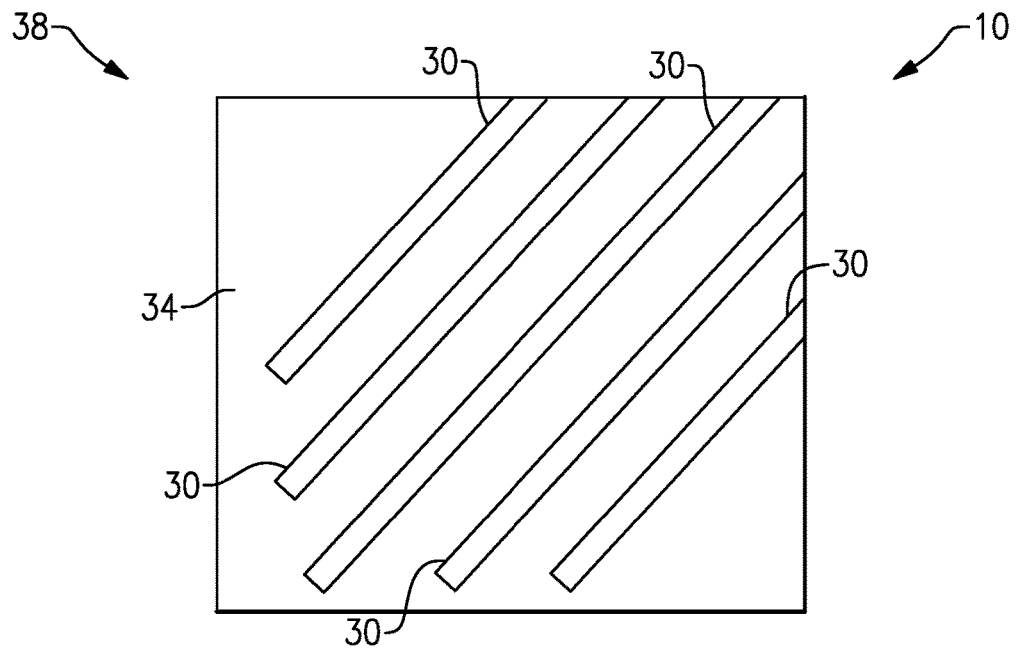
FIG. 4 is a sectional view of a portion of the ceramic matrix composite (CMC) component of FIG. 1 taken in direction 4-4 of FIG. 1 and illustrating a single CMC ply, in accordance with one or more embodiments disclosed herein.
Figure 5:
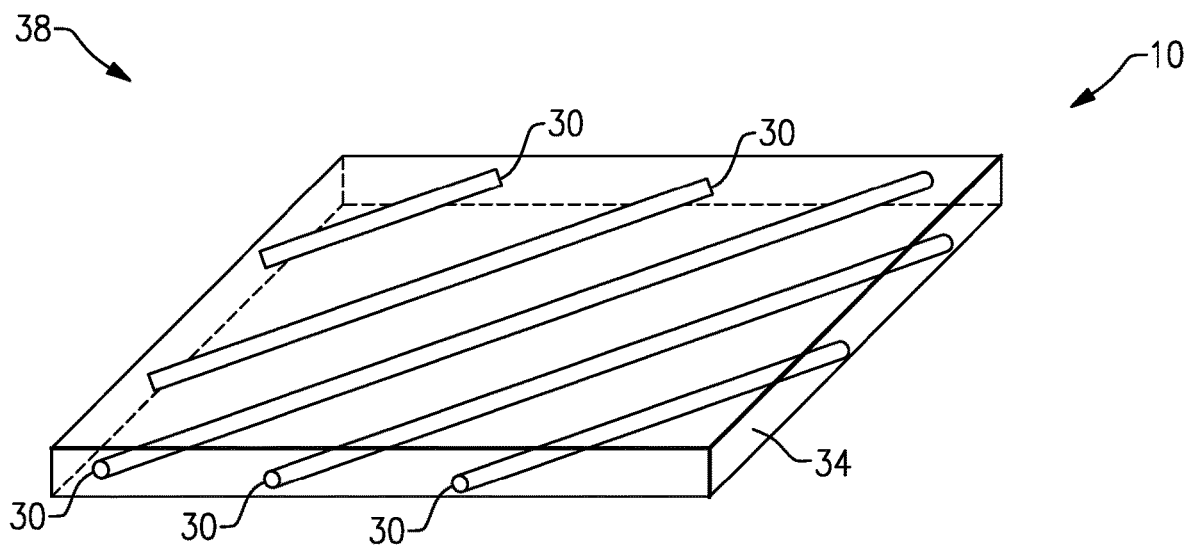
FIG. 5 is an isometric view of the portion of the ceramic matrix composite (CMC) component of FIG. 4, in accordance with one or more embodiments disclosed herein.
Figure 6:
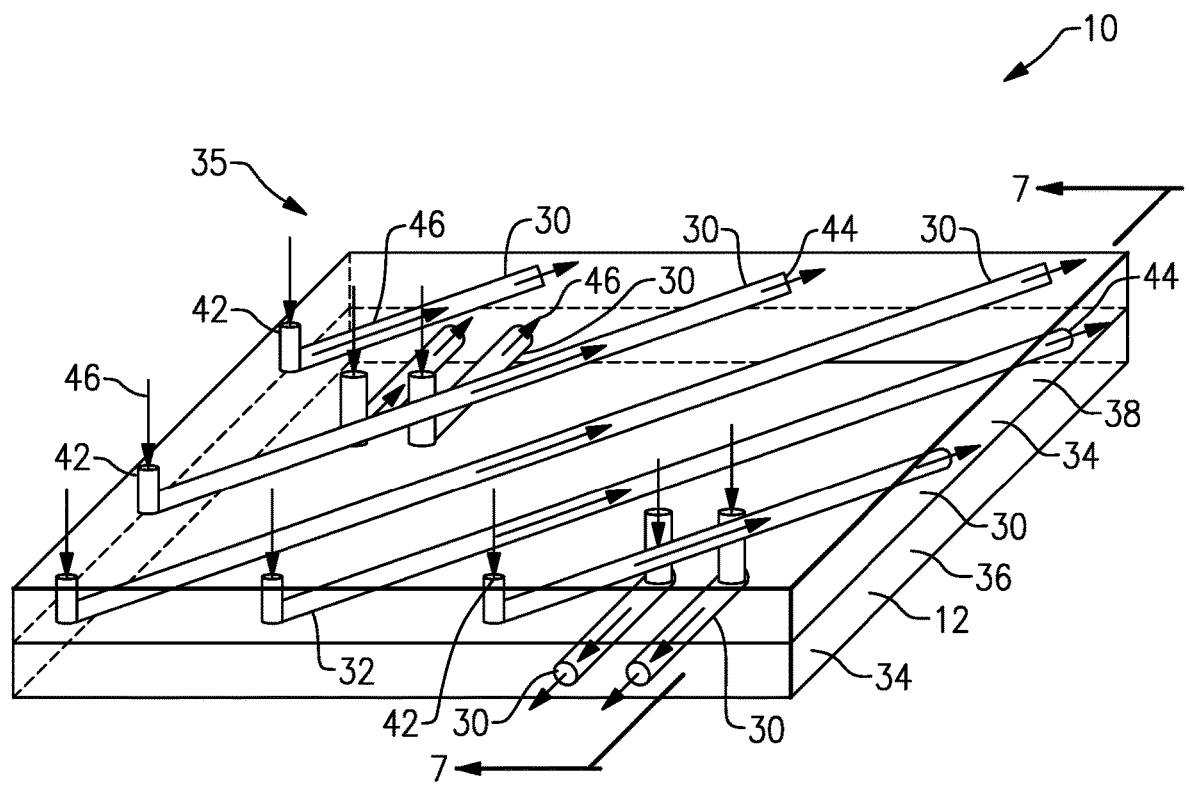
FIG. 6 is an isometric view of the CMC plies of FIGS. 4 and 5 in stacked arrangement, in accordance with one or more embodiments disclosed herein.
Figure 7:
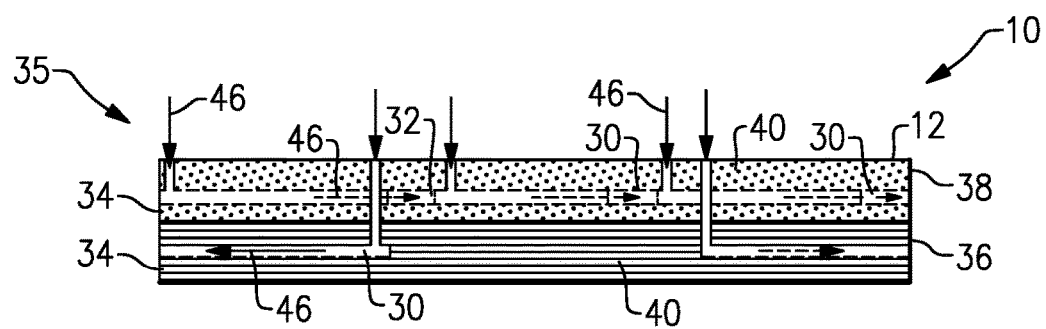
FIG. 7 is a simplified sectional view taken through line 7-7 of FIG. 6, in accordance with one or more embodiments disclosed herein.

Referring now to FIGS. 2-7, illustrated are partial sectional and isometric views of a portion of the component 10 of FIG. 1. FIGS. 2-5 illustrate alternating ceramic matrix composite (CMC) plies 34 of a stack 35 (FIGS. 6 and 7), including one or more elongate functional features 30 formed therein. More particularly, illustrated in FIGS. 2 and 3, is a first fiber ply 36, comprised of a plurality of fibers (not shown), including one or more elongate functional features 30, and more particularly a plurality of cooling channels 32 (FIGS. 6 and 7). Illustrated in FIGS. 4 and 5, is a second fiber ply 38, comprised of a plurality of fibers (not shown), including one or more elongate functional features 30, and more particularly a plurality of cooling channels 32 (FIGS. 6 and 7). When configured in a stack formation as illustrated in FIGS. 6 and 7, the one or more elongate functional features 30 of the first and second fiber plies 36, 38 define the plurality of cooling channels 32 and a cooling circuit therethrough the component 10.

The one or more elongate functional features 30 are defined within each of the plurality of fiber plies 36, 38 using a plurality of sacrificial fibers. Fabrication of elongate functional features using sacrificial fibers is described in commonly assigned, U.S. Pat. No. 10,384,981, by D. Hall et al., and entitled "Methods of Forming Ceramic Matrix Composites Using Sacrificial Fibers and Related Products," which is incorporated herein in its entirety and U.S. patent application, filed simultaneously herewith, by D. Dunn et al., and entitled "Methods of Forming Ceramic Matrix Composites Using Sacrificial Fibers and Non-Wetting Coating", which is incorporated herein in its entirety.

As illustrated in FIG. 7, the component 10 is comprised of a stack 35 of a plurality of ceramic matrix composite (CMC) plies, of which only fiber plies 36 and 38 have been shown for clarity. Each of the fiber plies 36, 38 is comprised of a plurality of fibers 40 of which only a few have been shown for clarity. In this particular embodiment, the fiber plies 36 and 38 are oriented in a 90° orientation, relative to one another, with respect to the alignment of the fibers 40 in each ply 36, 38. The one or more elongate functional features 30 of FIGS. 2-7 are in fluid communication with the plenum (not shown) via a plurality of inlets (described presently) and an exterior the component 10 via a plurality of outlets (described presently). In an alternate embodiment, at least one of the one or more elongate functional features 30 may be in fluid communication with an alternative source of cooling fluid (not shown).

Referring more specifically to FIG. 6, illustrated are the one or more elongate functional features 30. The one or more functional features 30 form a complex network of inter-ply fluid passages or cooling channels 32. Each of the plurality of cooling channels 32 include and inlet 42 and an outlet 44. Each inlet 42 is in fluid communication with a source of a cooling fluid, such as a plenum (not shown) or an alternative source. Each outlet 44 is in fluid communication with an exterior the component 10.

Within each cooling channel 32 flows a cooling fluid 46. As illustrated, the plurality of cooling channels 32 are configured in a multi-plane, or multi-ply, configuration to provide for a cooling fluid flow in each of the CMC plies 36, 38. In a preferred embodiment, the cooling channels 32 are configured in alignment with the fibers 40 of a respective CMC ply 36, 38 to maintain the structural integrity of the component 10. The inclusion of the cooling channels 32 in multiple fiber plies of the CMC component 10 limits the strength reduction for any given ply while also providing a change in channel orientation without cutting through the fibers 40. As previously stated, the design of the cooling channels 32 provides for greater robustness to recession, provides maintenance of the component structural integrity and reduces thermal stresses by spreading out the cooling channels through the CMC space.

In the illustrated embodiment of FIGS. 1-7, the arrangement of the ceramic matrix composite plies 34 and the cooling channels 32 are schematic and have been enlarged for illustration purposes. The size and geometry of the CMC plies 34 and voids, such as the cooling channels 32, are not limited to those shown in FIG. 1-7.

Figure 8:
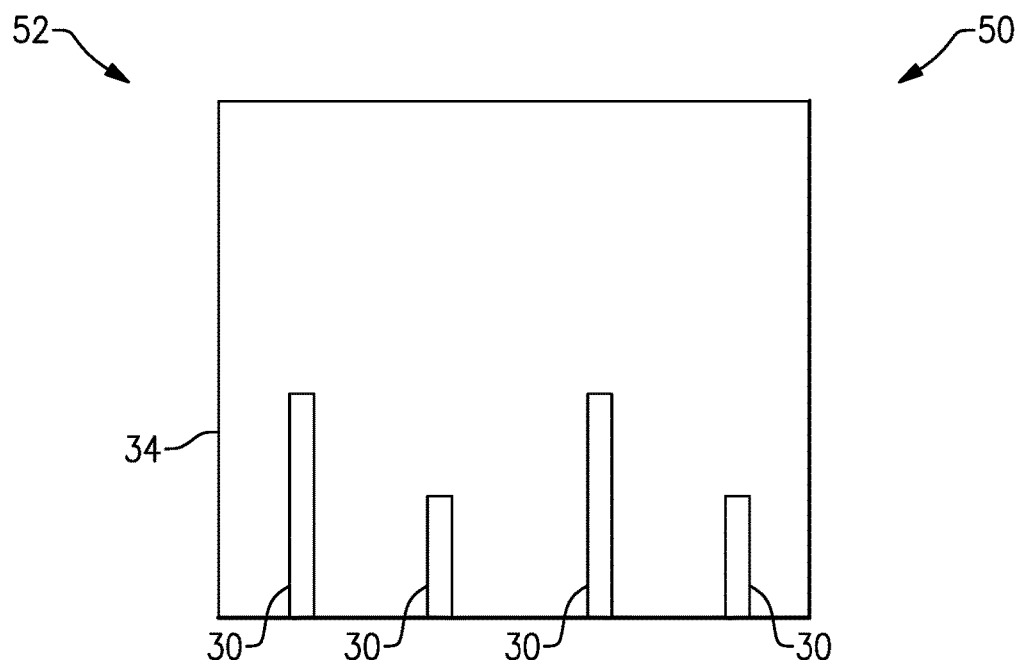
FIG. 8 is a sectional view of a portion of another ceramic matrix composite (CMC) component illustrating a single CMC ply, in accordance with one or more embodiments disclosed herein.
Figure 9:
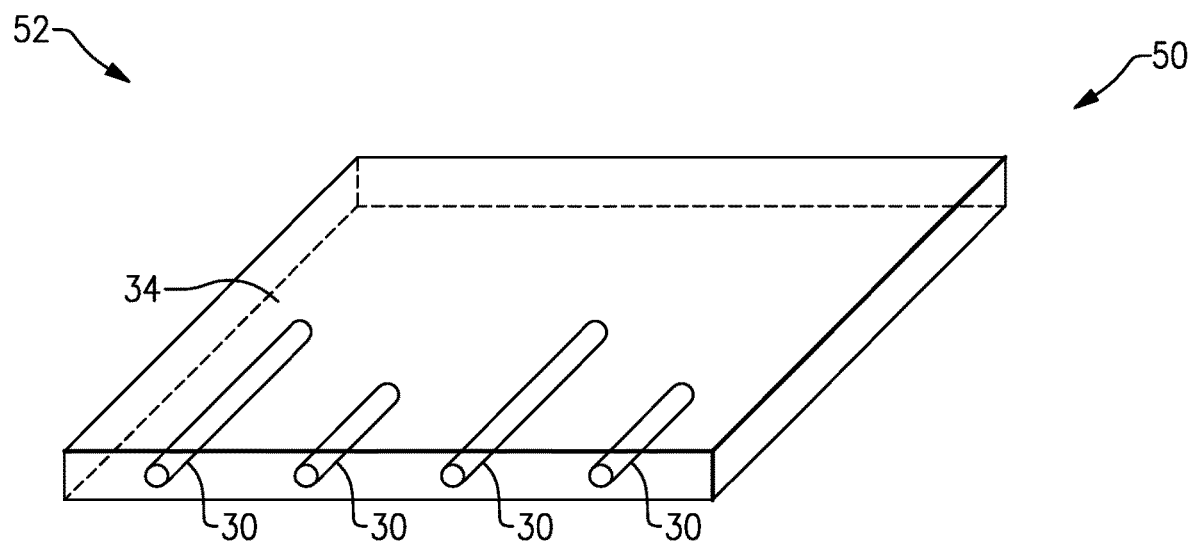
FIG. 9 is an isometric view of the portion of the ceramic matrix composite (CMC) component of FIG. 8, in accordance with one or more embodiments disclosed herein.
Figure 10:
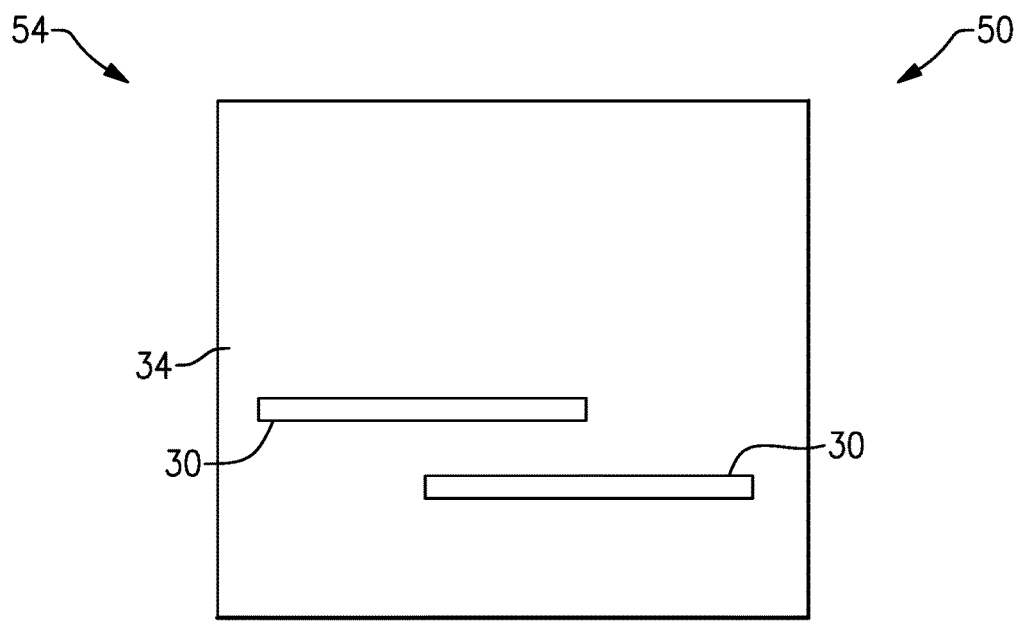
FIG. 10 is a sectional view of a portion of another ceramic matrix composite (CMC) component illustrating a single CMC ply, in accordance with one or more embodiments disclosed herein.
Figure 11:
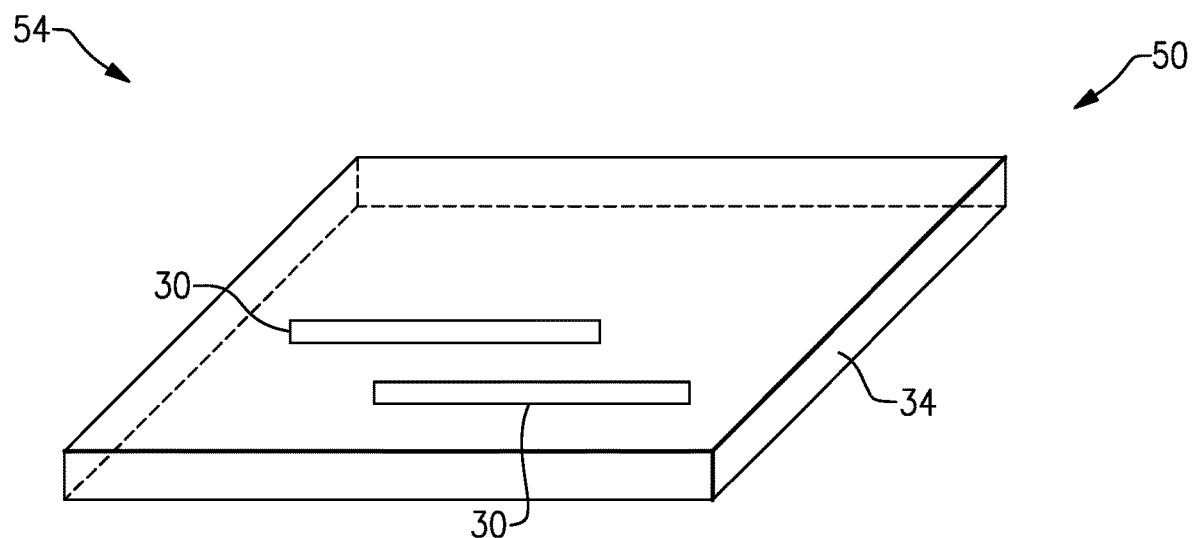
FIG. 11 is an isometric view of the portion of the ceramic matrix composite (CMC) component of FIG. 10, in accordance with one or more embodiments disclosed herein.
Figure 12:
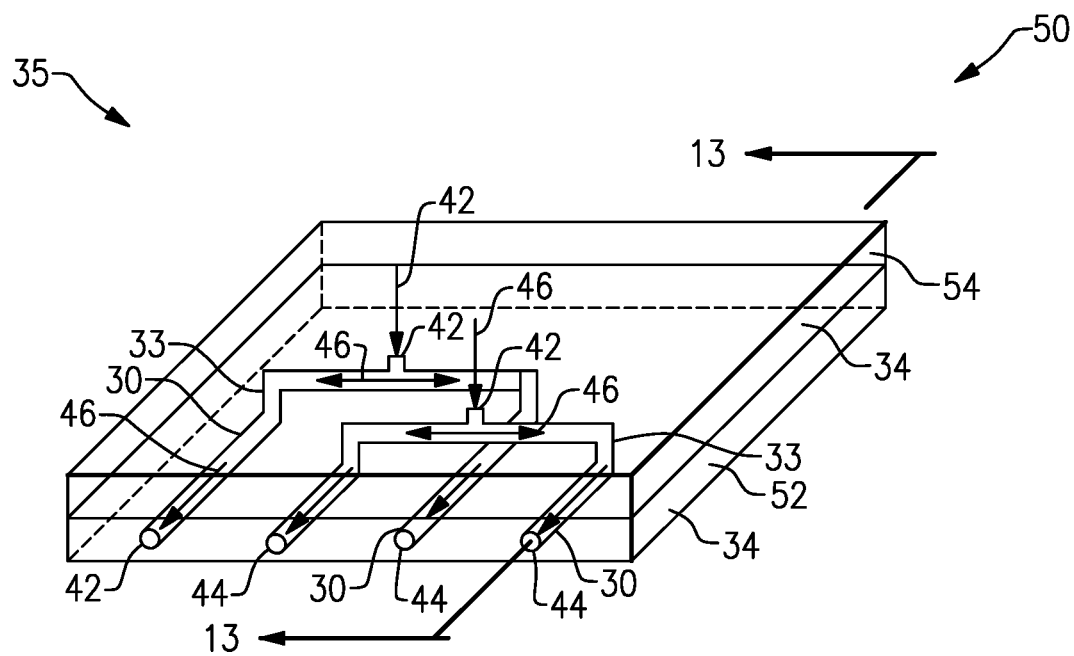
FIG. 12 is an isometric view of the CMC plies of FIGS. 8 and 10 in stacked arrangement, in accordance with one or more embodiments disclosed herein.
Figure 13:
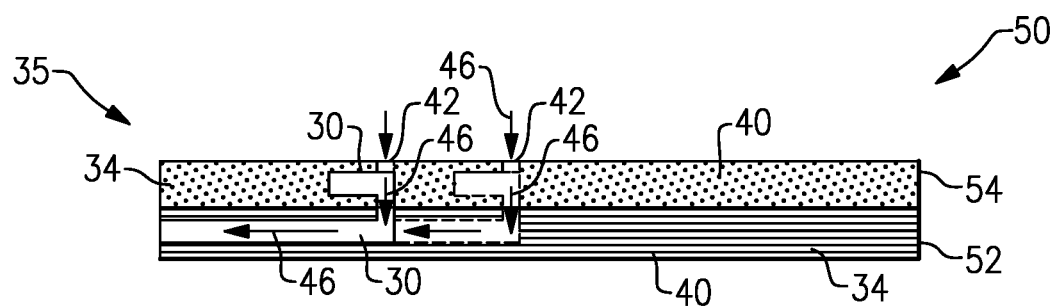
FIG. 13 is a simplified sectional view taken through line 13-13 of FIG. 12, in accordance with one or more embodiments disclosed herein.

Referring now to FIGS. 8-13, illustrated are partial sectional and isometric views of an alternate embodiment of a component 50, generally similar to the component 10 of FIG. 1. FIGS. 8-11 illustrate alternating ceramic matrix composite (CMC) plies 34 of a stack 35 (FIGS. 12 and 13), including one or more elongate functional features 30 formed therein. More particularly, illustrated in FIGS. 8 and 9, is a first fiber ply 52, comprised of a plurality of fibers (not shown), including one or more elongate functional features 30, and more particularly a plurality of cooling channels 32 (FIGS. 12 and 13). Illustrated in FIGS. 10 and 11, is a second fiber ply 54, comprised of a plurality of fibers (not shown), including one or more elongate functional features 30, and more particularly a plurality of cooling channels 32 (FIGS. 12 and 13). When configured in a stack formation as illustrated in FIGS. 12 and 13, the one or more elongate functional features of the first and second fiber plies 52, 54 define the plurality of cooling channels 32.

The one or more elongate functional features 30 are defined within each of the plurality of fiber plies 52, 54 using a plurality of sacrificial fibers, as previously described.

As illustrated in FIGS. 12 and 13, the component 50 is comprised of the stack 35 of a plurality of ceramic matrix composite (CMC) plies, of which only fiber plies 52 and 54 have been shown for clarity. Each of the fiber plies 52, 54 is comprised of a plurality of fibers 40 of which only a few have been shown for clarity. In this particular embodiment, each of the one or more functional features 30 in fiber ply 52 is in fluid communication with one or more of the functional features 30 in fiber ply 54 via a fluid connection 33 formed via one or more of laser drilling, electrical discharge machining, cutting or machining the ceramic matrix composite material. The one or more elongate functional features 30 of FIGS. 8-13 are in fluid communication with the plenum (not shown) via a plurality of inlets (described presently) and an exterior the component 50 via a plurality of outlets (described presently). In an alternate embodiment, at least one of the one or more elongate functional features 30 may be in fluid communication with an alternative source of cooling fluid (not shown).

Referring more specifically to FIG. 12, illustrated are the one or more elongate functional features 30. The one or more functional features 30 form a complex network of inter-ply fluid passages or cooling channels 32. Each of the plurality of cooling channels 32 include and inlet 42 and an outlet 44. Each inlet 42 is in fluid communication with a source of a cooling fluid, such as a plenum (not shown) or an alternative source. Each outlet 44 is in fluid communication with an exterior the component 50.

Within each cooling channel 32 flows a cooling fluid 46. As illustrated, the plurality of cooling channels 32 are configured in a multi-plane configuration to provide for a cooling fluid flow in each of the CMC plies 52, 54. The cooling channels 32 are configured in alignment with the fibers 40 of a respective CMC ply 52, 54 to maintain the structural integrity of the component 50. Similar to the previously disclosed embodiments, the inclusion of the cooling channels 32 in multiple fiber plies of the CMC component 50 limits the strength reduction for any given ply while also providing a change in channel orientation without cutting through the fibers 40. As previously stated, the design of the cooling channels 32 provides for greater robustness to recession, provides maintenance of the component structural integrity and reduces thermal stresses by spreading out the channels through the CMC space.

In the illustrated embodiment of FIGS. 8-13, the arrangement of the ceramic matrix composite plies 34 and the cooling channels 32 are schematic and have been enlarged for illustration purposes. The size, number and geometry of the CMC plies 34 and voids, such as the cooling channels 32, are not limited to those shown in FIG. 8-13.

Figure 14:
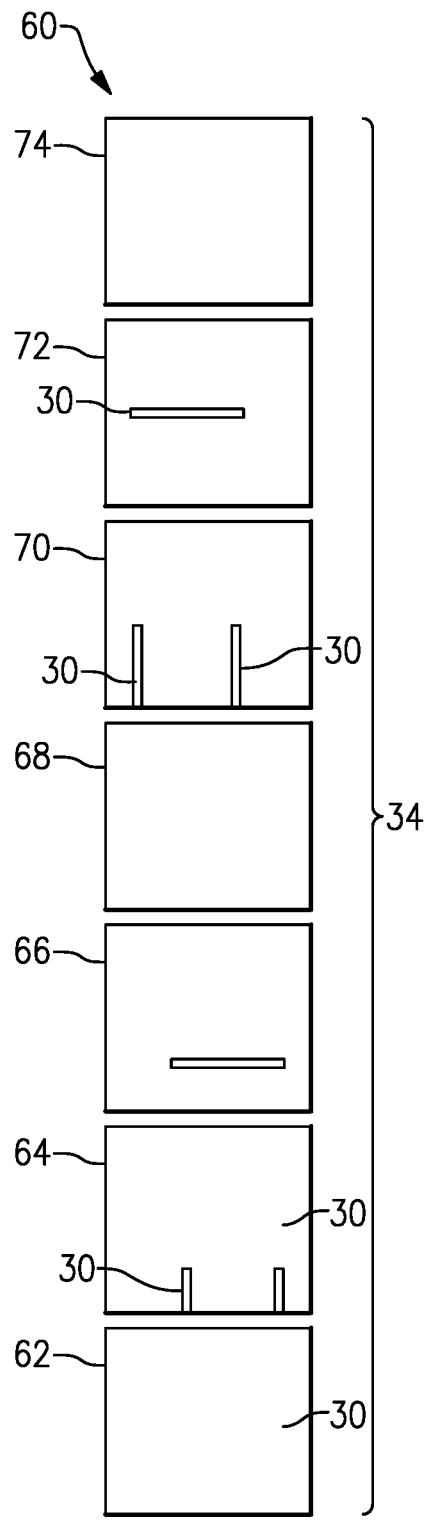
FIG. 14 are plan views of a portion of another ceramic matrix composite (CMC) component illustrating a plurality of CMC plies, in accordance with one or more embodiments disclosed herein.
Figure 15:
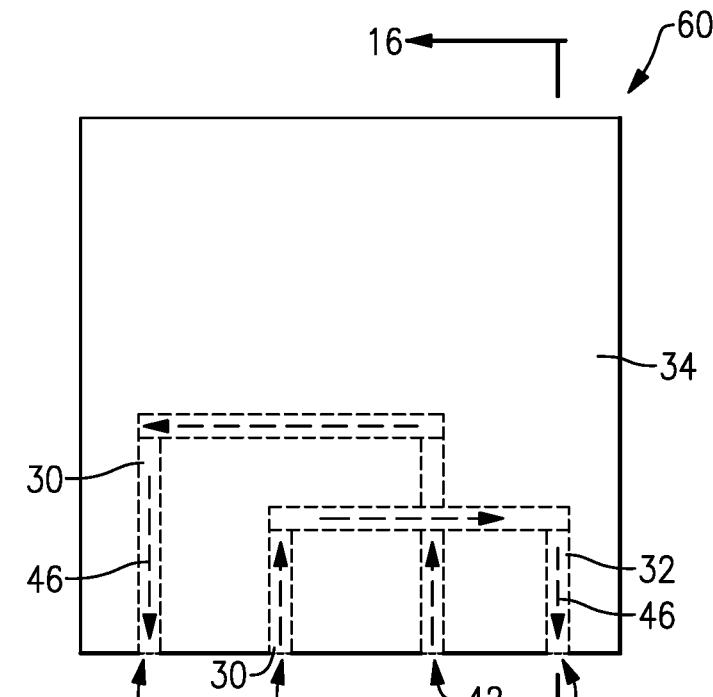
FIG. 15 is a plan view of the CMC plies of FIG. 14 in stacked arrangement, in accordance with one or more embodiments disclosed herein.
Figure 16:
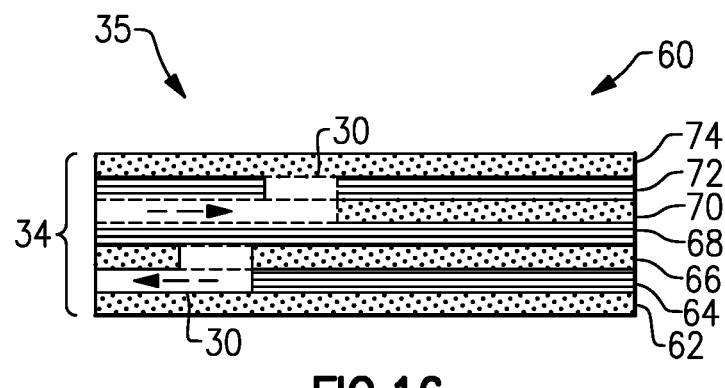
FIG. 16 is a simplified sectional view taken through line 16-16 of FIG. 15, in accordance with one or more embodiments disclosed herein.

Referring now to FIGS. 14-16, illustrated are schematic views of another embodiment of a portion of a component 60, generally similar to the component 10 of FIG. 1. More particularly, FIG. 14 includes a top view of a plurality of plies 34, referenced individually as plies 62-74, generally similar to plies 34 of FIGS. 1-7. FIG. 15 is a schematic top view of the component 60 illustrating one or more functional features 30 that form a cooling circuit configuration. FIG. 16 is a sectional view of the component 60 taken in direction 16-16 of FIG. 15. Unless otherwise indicated, the component 60 includes the same components identified during the description of the component 10 of FIGS. 1-7. The component 60 includes a plurality of cooling channels 32 forming a cooling circuit configuration similar to the embodiment of FIG. 8-13, as previously described. Similar to the component 10, the component 60 is comprised of a plurality of ceramic matrix composite (CMC) plies 34, and more particularly individual plies 62-74, each comprised of a plurality of CMC fibers 40 of which only a few have been shown for clarity. In this particular embodiment, additional CMC plies without the inclusion of functional features are disclosed, as best illustrated in FIG. 14. More specifically, FIG. 14 illustrates seven individual plies, referenced 62-74, of which plies 64, 66, 70 and 72 include one or more elongate functional features 30 formed therein. The plies 62-74 are configured in a stack 35, as illustrated in FIGS. 15 and 16 to fluidically couple the one or more elongate functional features 30 and define the multi-plane cooling channels 32 in the component 60. Each of the plurality of cooling channels 32 includes and inlet 42 and an outlet 44. In this particular embodiment, each of the one or more functional features 30 in fiber ply 64 is in fluid communication with one or more of the functional features 30 in fiber ply 66 via a fluid connection 33 formed directly during lay-up or via one or more of laser drilling, electrical discharge machining, cutting or machining the ceramic matrix composite material. In addition, each of the one or more functional features 30 in fiber ply 70 is in fluid communication with one or more of the functional features 30 in fiber ply 72 via a fluid connection 33 formed directly during lay-up or via one or more of laser drilling, electrical discharge machining, cutting or machining the ceramic matrix composite material. Each inlet 42 is in fluid communication with a source of cooling fluid, such as a plenum (not shown) or an alternative source. Each outlet 44 is in fluid communication with an exterior the component 60. Within each cooling channel 32 flows a cooling fluid 46. As illustrated, the plurality of cooling channels 32 are configured in multiple fiber plies, or planes, of the CMC preform, or component 60.

In the illustrated embodiment of FIGS. 14-16, the arrangement of the ceramic matrix composite plies 62-74 and the cooling channels 32 are schematic and have been enlarged for illustration purposes. The size, number and geometry of the CMC plies 62-74 and voids, such as the cooling channels 32, are not limited to those shown in FIG. 14-16.

Figure 17:
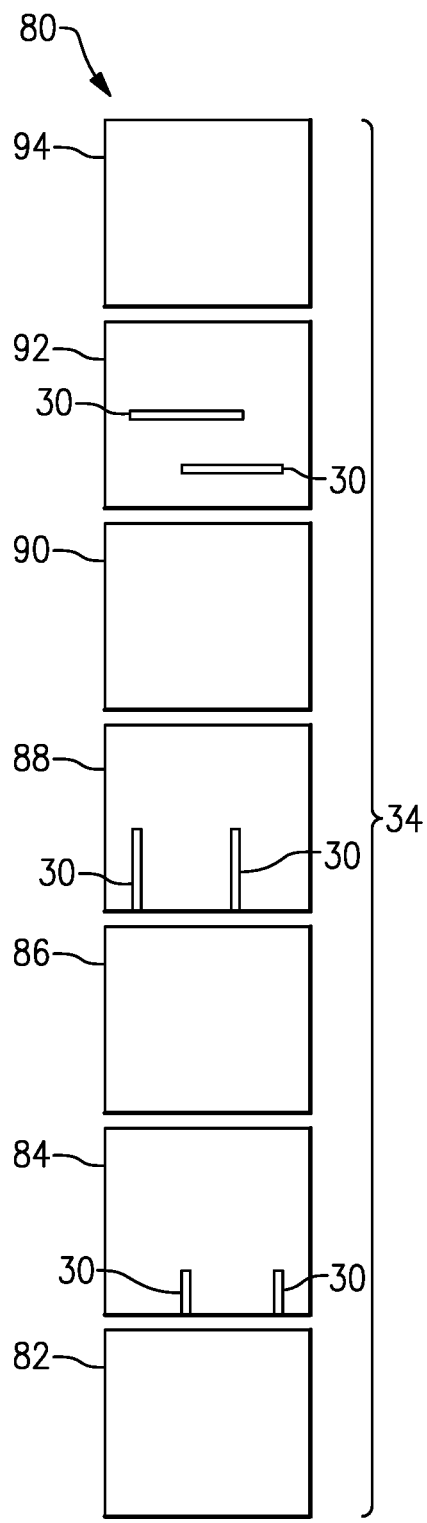
FIG. 17 are plan views of a portion of another ceramic matrix composite (CMC) component illustrating a plurality of CMC plies, in accordance with one or more embodiments disclosed herein.
Figure 18:
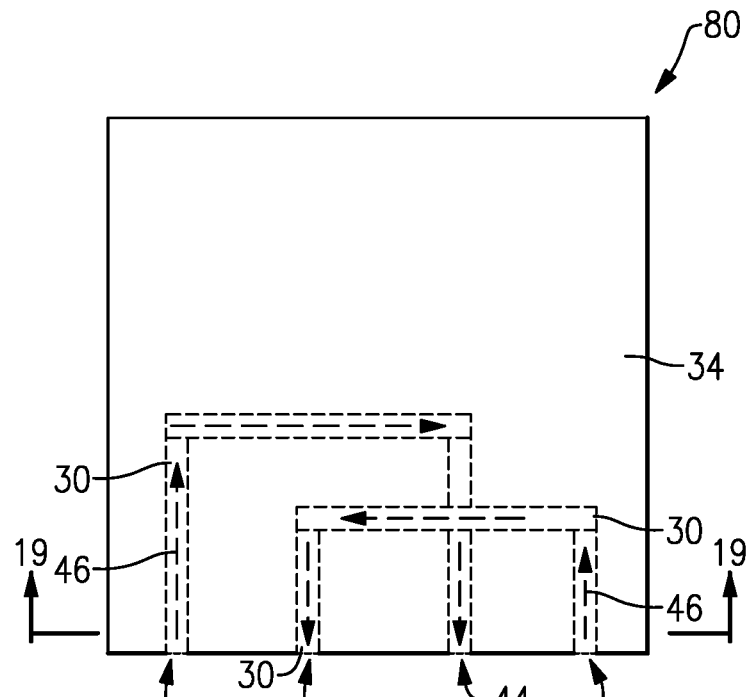
FIG. 18 is a plan view of the CMC plies of FIG. 17 in stacked arrangement, in accordance with one or more embodiments disclosed herein.
Figure 19:
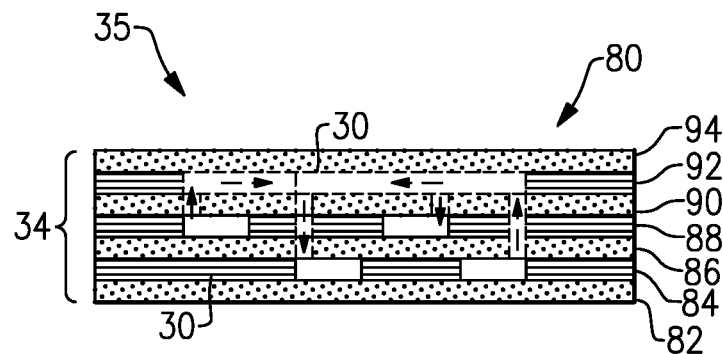
FIG. 19 is a simplified sectional view taken through line 19-19 of FIG. 18, in accordance with one or more embodiments disclosed herein.

Referring now to FIGS. 17-19, illustrated are schematic views of another embodiment of a portion of a component 80, generally similar to the component 10 of FIG. 1. More particularly, FIG. 17 includes a top view of a plurality of plies 34, individually referenced as plies 82-94, generally similar to plies 34 of FIGS. 1-7. FIG. 18 is a schematic top view of the component 80 illustrating one or more functional features 30 that form a cooling circuit configuration. FIG. 19 is a sectional view of the component 80 taken in direction 19-19 of FIG. 18. Unless otherwise indicated, the component 80 includes the same components identified during the description of the component 10 of FIGS. 1-7. The component 80 includes a plurality of cooling channels 32 forming a cooling circuit configuration similar to the embodiment of FIG. 8-13, as previously described. Similar to the component 10, the component 80 is comprised of a plurality of ceramic matrix composite (CMC) plies 34, and more particularly individual plies 82-94, each comprised of a plurality of CMC fibers 40 of which only a few have been shown for clarity. In this particular embodiment, additional CMC plies without the inclusion of functional features are disclosed, as best illustrated in FIG. 17. More specifically, FIG. 17 illustrates seven individual plies, referenced 82-94, of which alternating plies 84, 88, and 92 include one or more elongate functional features 30 formed therein. The plies 82-94 are configured in a stack 35, as illustrated in FIGS. 18 and 19 to fluidically couple the one or more elongate functional features 30 and define the multi-plane cooling channels 32 in the component 80. Each of the plurality of cooling channels 32 includes and inlet 42 and an outlet 44. In this particular embodiment, each of the one or more functional features 30 in fiber ply 84 is in fluid communication with one or more of the functional features 30 in fiber ply 92 via a fluid connection 33 formed via one or more of laser drilling, electrical discharge machining, cutting or machining the ceramic matrix composite material. In addition, each of the one or more functional features 30 in fiber ply 88 is in fluid communication with one or more of the functional features 30 in fiber ply 92 via a fluid connection 33 formed via one or more of laser drilling, electrical discharge machining, cutting or machining the ceramic matrix composite material. Each inlet 42 is in fluid communication with a source of cooling fluid, such as a plenum (not shown) or an alternative source. Each outlet 44 is in fluid communication with an exterior the component 10. Within each cooling channel 32 flows a cooling fluid 46. As illustrated, the plurality of cooling channels 32 are configured in a multiple fiber plies, or planes, of the CMC preform, or component 80.

In the illustrated embodiment of FIGS. 17-19, the arrangement of the ceramic matrix composite plies 82-94 and the cooling channels 32 are schematic and have been enlarged for illustration purposes. The size, number and geometry of the CMC plies 82-94 and voids, such as the cooling channels 32, are not limited to those shown in FIG. 17-19.

Figure 20:
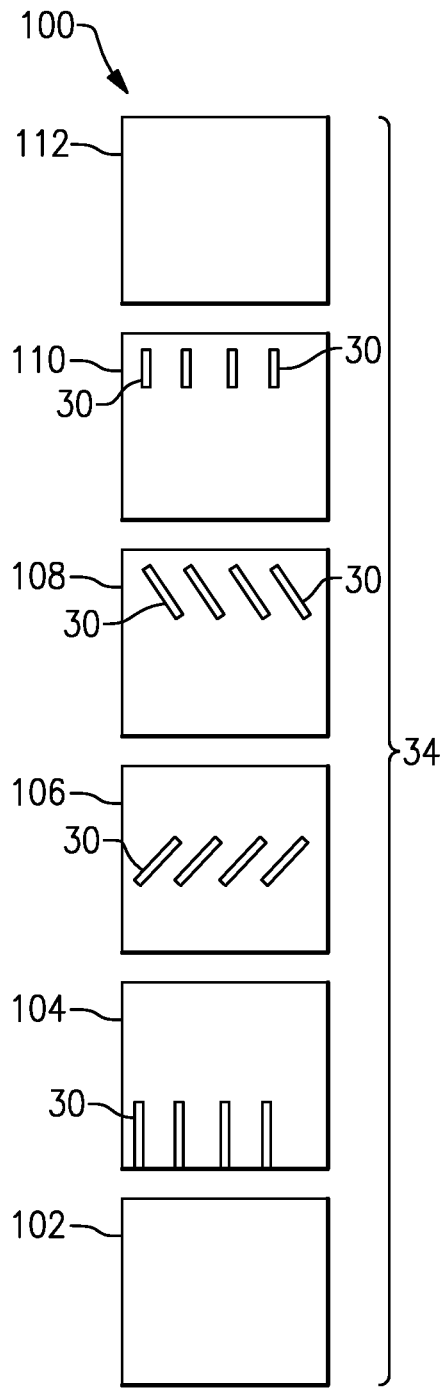
FIG. 20 are plan views of a portion of another ceramic matrix composite (CMC) component illustrating a plurality of CMC plies, in accordance with one or more embodiments disclosed herein.
Figure 21:
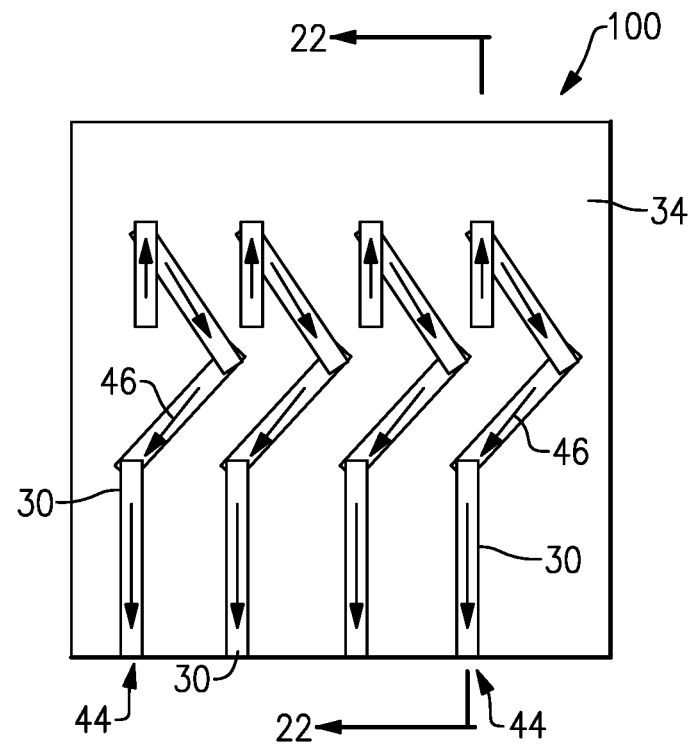
FIG. 21 is a plan view of the CMC plies of FIG. 20 in stacked arrangement, in accordance with one or more embodiments disclosed herein.
Figure 22:
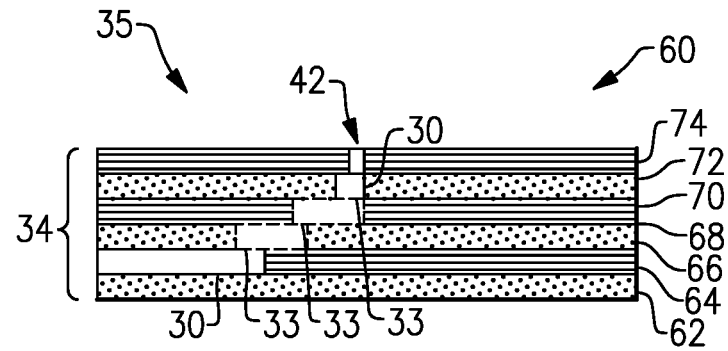
FIG. 22 is a simplified sectional view taken through line 22-22 of FIG. 21, in accordance with one or more embodiments disclosed herein.

Referring now to FIGS. 20-22, illustrated are schematic views of another embodiment of a portion of a component 100, generally similar to the component 10 of FIG. 1. More particularly, FIG. 20 includes a top view of a plurality of plies 34, individually referenced as plies 102-112, generally similar to plies 34 of FIGS. 1-7. FIG. 21 is a schematic top view of the component 100 illustrating one or more functional features 30 that form a cooling circuit configuration. FIG. 22 is a sectional view of the component 100 taken in direction 22-22 of FIG. 21. Unless otherwise indicated, the component 100 includes the same components identified during the description of the component 10 of FIGS. 1-7. The component 100 includes a plurality of cooling channels 32 forming a z-type cooling circuit configuration. Similar to the component 10, the component 100 is comprised of a plurality of ceramic matrix composite (CMC) plies 34, and more particularly individual plies 102-112, each comprised of a plurality of CMC fibers 40 of which only a few have been shown for clarity. In this particular embodiment, additional CMC plies without the inclusion of functional features are disclosed, as best illustrated in FIG. 20. More specifically, FIG. 20 illustrates six individual plies, referenced 102-112, of which only plies 104-110 include one or more elongate functional features 30 formed therein. The plies 102-112 are configured in a stack 35, as illustrated in FIGS. 21 and 22 to fluidically couple the one or more elongate functional features 30 and define the multi-plane cooling channels 32 in the component 100. More particularly, in this particular embodiment, each of the one or more functional features 30 in fiber ply 104 is in fluid communication with one or more of the functional features 30 in fiber ply 106 via a fluid connection 33 formed directly during lay-up or via one or more of laser drilling, electrical discharge machining, cutting or machining the ceramic matrix composite material. Additionally, each of the one or more functional features 30 in fiber ply 106 is in fluid communication with one or more of the functional features 30 in fiber ply 108, and each of the one or more functional features 30 in fiber ply 108 is in fluid communication with one or more of the functional features 30 in fiber ply 110 via a fluid connection 33 formed directly during lay-up or via one or more of laser drilling, electrical discharge machining, cutting or machining the ceramic matrix composite material. Each of the plurality of cooling channels 32 includes and inlet 42 and an outlet 44. Each inlet 42 is in fluid communication with a source of cooling fluid, such as a plenum (not shown) or an alternative source. Each outlet 44 is in fluid communication with an exterior the component 100. Within each cooling channel 32 flows a cooling fluid 46. As illustrated, the plurality of cooling channels 32 are configured in a multiple fiber plies, or planes, of the CMC preform, or component 100.

In the illustrated embodiment of FIGS. 20-22, the arrangement of the ceramic matrix composite plies 34 and the cooling channels 32 are schematic and have been enlarged for illustration purposes. The size, number and geometry of the CMC plies 34 and voids, such as the cooling channels 32, are not limited to those shown in FIG. 20-22.

Figure 23:
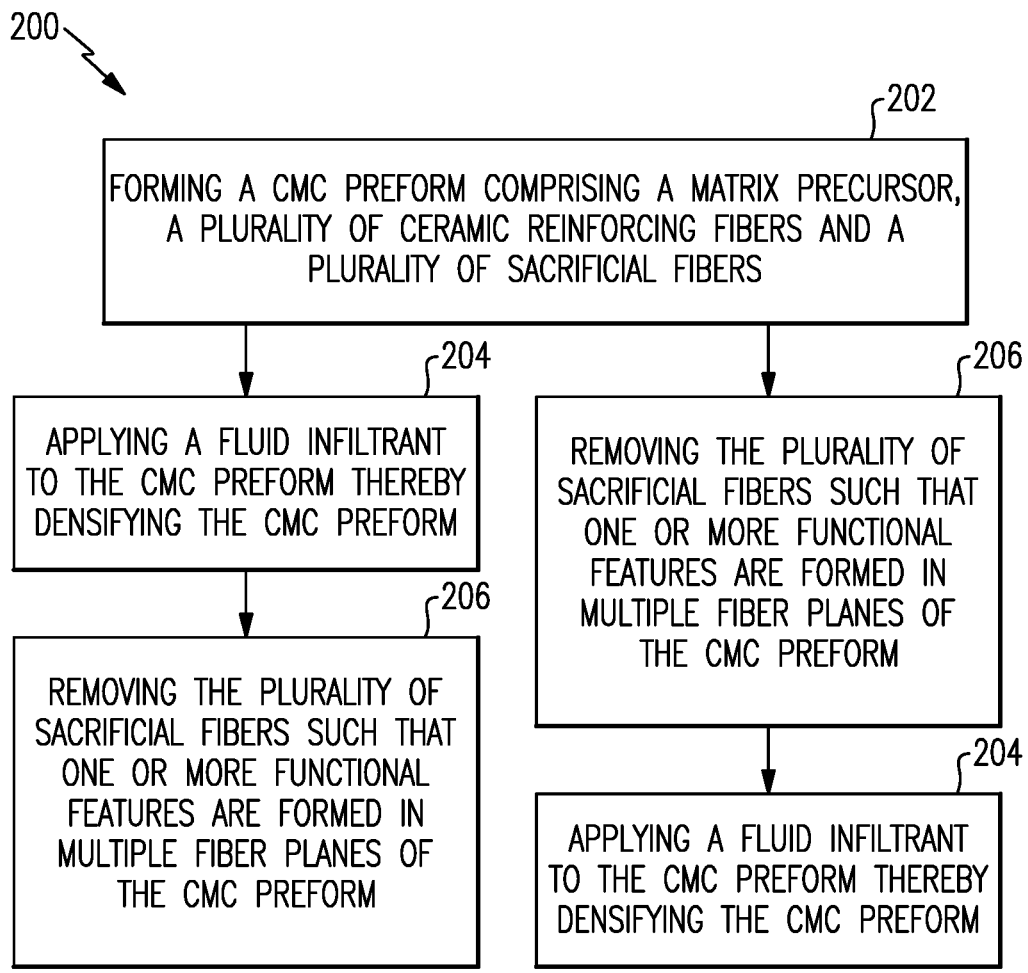
FIG. 23 schematically shows a method for forming a CMC component, in accordance with one or more embodiments disclosed herein.

FIG. 23 schematically shows a method 200 of forming the CMC component 10, 50, 60, 80, 100 according to the present disclosure, having one or more elongate functional features 30 defined therein multiple fiber plies, or planes, and more specifically, a plurality of cooling channels 32 formed through multiple plies of the CMC component. Component 10, 50, 60, 80, 100 is formed using a lay-up technique. Method 200 includes initially forming a CMC preform comprising a matrix precursor, a plurality of ceramic reinforcing fibers and a plurality of sacrificial fibers, in a step 202. Forming the CMC preform includes initially providing a plurality of ceramic matrix composite plies 34, such as a series of plies 34 formed into a laminate stack. An example of material for plies 34 includes, but is not limited to, pre-preg composite plies including, for example, woven carbon fiber, binder material and coated SiC fibers, as previously described.

As previously described, the method, and more particularly step 202 of forming the CMC preform, includes a means for defining one or more elongate functional features within the plies 34, such as by using a plurality of sacrificial fibers. The sacrificial fibers enable the forming of the one or more elongate functional features 30 for enhancing the function of the CMC, such a plurality of cooling channels 32 in the CMC preform. Fabrication of elongate functional features using sacrificial fibers are discussed in is discussed in the above-referenced commonly assigned, U.S. Pat. No. 10,384,981 and U.S. patent application. The geometry of the one or more elongate functional features 30 defined therein the CMC preform includes any suitable geometry including a rounded, curved, elliptical, rectilinear or other suitable geometry.

Additional plies 34 are disposed to enclose the sacrificial fibers. The preform component is placed in an autoclave and an autoclave cycle is completed to form the CMC preform comprising the matrix precursor, the plurality of ceramic reinforcing fibers and the plurality of sacrificial fibers. The preform component is subject to typical autoclave pressures and temperature cycles used in the industry for ceramic composite materials. Autoclaving pulls out any volatiles remaining in the plies and autoclave conditions can be varied depending on the ply material. After autoclaving, a burn-out method is performed to remove any remaining material or additional binders in the pre-form component. The burn-out method is generally conducted at a temperature of approximately 426-648° C. (approximately 800-1200° F.).

After burn-out, the preform component is placed in a vacuum furnace for densification, in a step 204. Densification is performed using any known densification technique including, but not limited to, Silicomp, melt infiltration (MI), chemical vapor infiltration (CVI), polymer inflation pyrolysis (PIP), and oxide/oxide methods. Densification can be conducted in a vacuum furnace having an established atmosphere at temperatures above 1200° C. to allow Silicon or other infiltrant materials to melt-infiltrate into the preform component. One suitable method of densification is melt infiltration wherein molten matrix material is drawn into the plies 34 and permitted to solidify. After densification, the densified preform component or densified body includes the plurality of sacrificial fibers disposed therein, as shown in step 104, and forms at least a portion of the component 10, 50, 60, 80, 100.

Subsequent to densification, the one or more elongate functional features 30 are further formed by removing the sacrificial fibers, to leave a plurality of elongate channels, defining the cooling channels 32, in a step 206. The removal of the sacrificial fibers to form the elongate channels is discussed in the above-referenced commonly assigned, U.S. Pat. No. 10,384,981 and U.S. patent application.

In an alternate embodiment, the one or more elongate functional features 30 are further formed by removing the plurality of sacrificial fibers, to leave a plurality of channels 32 prior to densification, as described in step 204.

In an embodiment, an internal hollow portion of each of the one or more elongate functional features 30 is sufficiently large and open in the component 10, 50, 60, 80, 100 such that coolant or other fluid can be directed therethrough to provide cooling to component 10, 50, 60, 80, 100. However, the densified matrix material formed at the ceramic matrix composite ply 34 may form a blockage that substantially prevents flow of coolant or other fluids and more particularly, forms the one or more elongate functional features 30 as a closed structure that is internal to the component 10, 50, 60, 80, 100. In an embodiment, openings are machined or otherwise formed into the component 10, 50, 60, 80, 100 to provide inlets 42 and/or outlets 44 to each of the one or more elongate functional features 30 to permit flow therethrough.

Accordingly, disclosed is a CMC component comprised of a CMC preform in which one or more functional features are formed in multiple fiber plies, or planes. By forming the one or more functional features in one or more fiber plies, or planes, or CMC plies, a network of cooling channels, or a cooling circuit, is formed in multiple fiber plies, or planes, while limiting strength reduction of any given ply, and allowing the cooling channels to change orientation without cutting the CMC fibers. As previously indicated, the design of the cooling circuit provides greater robustness to recession and reduces thermal stresses by spreading out the cooling channels in the CMC preform. The thermal penalty is minimal due to the relatively high conductivity of the CMC material.

The one or more functional features are formed in the CMC component during lay-up and aligned with the CMC fibers in a respective ply. In the simplest embodiment, the one or more functional features are aligned with the fibers, in a respective ply of a plurality of plies, that are arranged in alternating oriented plies. In more complex arrangements, the one or more functional features may form complex networks of inter-ply fluid passages. These inter-ply fluid passages may or may not connect directly during lay-up, and may be connected via laser drilling, or other methods.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceramic matrix composite component, comprising:
    a plurality of longitudinally extending ceramic matrix composite plies in a stacked configuration forming a densified body; and
    one or more elongate functional features formed therein the densified body,
    wherein each of the one or more elongate functional features includes an inlet and an outlet, the one or more elongate functional features configured to provide a flow of fluid from a fluid source to an exterior of the ceramic matrix composite component, and
    wherein the one or more elongate functional features are configured in multiple plies of the plurality of longitudinally extending ceramic matrix composite plies to form a plurality of cooling channels in multiple plies of the ceramic matrix composite component, wherein a plurality of cooling channels define a z-type cooling circuit configuration.

2. The ceramic matrix composite component of claim 1, wherein the one or more elongate functional features are enclosed within the densified body.

3. The ceramic matrix composite component of claim 1, wherein the plurality of longitudinally extending ceramic matrix composite plies are pre-impregnated ceramic matrix composite plies.

4. The ceramic matrix composite component of claim 1, wherein the ceramic matrix composite component is a hot gas path turbine component.

5. The ceramic matrix composite component of claim 4, wherein the hot gas path turbine component is selected from the group consisting of a combustor liner, a blade, a shroud, a nozzle, a nozzle end wall, and a blade platform.

6. A ceramic matrix composite component, comprising:
    a plurality of longitudinally extending ceramic matrix composite plies in a stacked configuration forming a densified body; and
    one or more elongate functional features formed therein the densified body,
    wherein each of the one or more elongate functional features includes an inlet and an outlet, the one or more elongate functional features configured to provide a flow of fluid from a fluid source to an exterior of the ceramic matrix composite component, and wherein the one or more elongate functional features are configured in multiple plies of the plurality of longitudinally extending ceramic matrix composite plies to form a plurality of cooling channels in multiple plies of the ceramic matrix composite component, wherein each of the one or more elongate functional features in each of the plurality of longitudinally extending ceramic matrix composite plies is in fluid communication with one or more elongate functional features in another one of the plurality of longitudinally extending ceramic matrix composite plies via one or more fluid connections.

7. The ceramic matrix composite component of claim 6, wherein the one or more fluid connections are formed via one or more of laser drilling, electrical discharge machining, cutting or machining the ceramic matrix composite material.

8. The ceramic matrix composite component of claim 6, wherein the one or more fluid connections comprise one or more laser drilled fluid connections.

9. The ceramic matrix composite component of claim 6, wherein the one or more fluid connections are formed during lay-up of the plurality of longitudinally extending ceramic matrix composite plies.

10. The ceramic matrix composite component of claim 6, wherein the plurality of longitudinally extending ceramic matrix composite plies are pre-impregnated ceramic matrix composite plies.

11. A ceramic matrix composite component, comprising:
a plurality of longitudinally extending ceramic matrix composite plies in a stacked configuration forming a densified body; and
one or more elongate functional features formed in multiple plies of the plurality of longitudinally extending ceramic matrix composite plies, each of the one or more elongate functional features in fluid communication with one or more elongate functional features in another one of the plurality of longitudinally extending ceramic matrix composite plies via one or more fluid connections,
wherein each of the one or more elongate functional features includes an inlet and an outlet, the one or more elongate functional features defining a plurality of cooling channels in multiple plies of the ceramic matrix composite component to carry a flow of fluid from a fluid source to an exterior of the ceramic matrix composite component.

12. The ceramic matrix composite component of claim 11, wherein the one or more fluid connections are formed via one or more of laser drilling, electrical discharge machining, cutting or machining the ceramic matrix composite material.

13. The ceramic matrix composite component of claim 11, wherein the one or more fluid connections are formed during layup of the plurality of longitudinally extending ceramic matrix composite plies.

14. The ceramic matrix composite component of claim 11, wherein the ceramic matrix composite component is a hot gas path turbine component.

15. The ceramic matrix composite component of claim 14, wherein the hot gas path turbine component is selected from the group consisting of a combustor liner, a blade, a shroud, a nozzle, a nozzle end wall, and a blade platform.

16. A method of forming a ceramic matrix composite (CMC) product comprising:
forming a CMC preform comprising a matrix precursor, a plurality of reinforcing fibers and a plurality of sacrificial fibers;
performing one of:
removing the plurality of sacrificial fibers such that one or more elongate functional features are formed in multiple fiber plies of the CMC preform; or
applying a fluid infiltrant to the CMC preform thereby densifying the CMC preform,
performing the other of:
removing the plurality of sacrificial fibers such that one or more elongate functional features are formed in multiple fiber plies of the CMC preform; or
applying a fluid infiltrant to the CMC preform thereby densifying the CMC preform, and
coupling the one or more functional features of the multiple fiber plies of the CMC preform in fluid communication to form a plurality of cooling channels in multiple plies of the ceramic matrix composite component.

17. The method of claim 16, wherein coupling the one or more functional features of the multiple fiber plies is by a method selected from the group consisting of laser drilling, electrical discharge machining, cutting and machining.

18. The method of claim 16, wherein the fluid infiltrant is silicon or a silicon alloy.

19. The method of claim 17, wherein the ceramic matrix composite component is a hot gas path turbine component.

20. The method of claim 19, wherein the hot gas path turbine component is selected from the group consisting of a combustor liner, a blade, a shroud, a nozzle, a nozzle end wall, and a blade platform.

* * * * *